Patented Dec. 6, 1927.

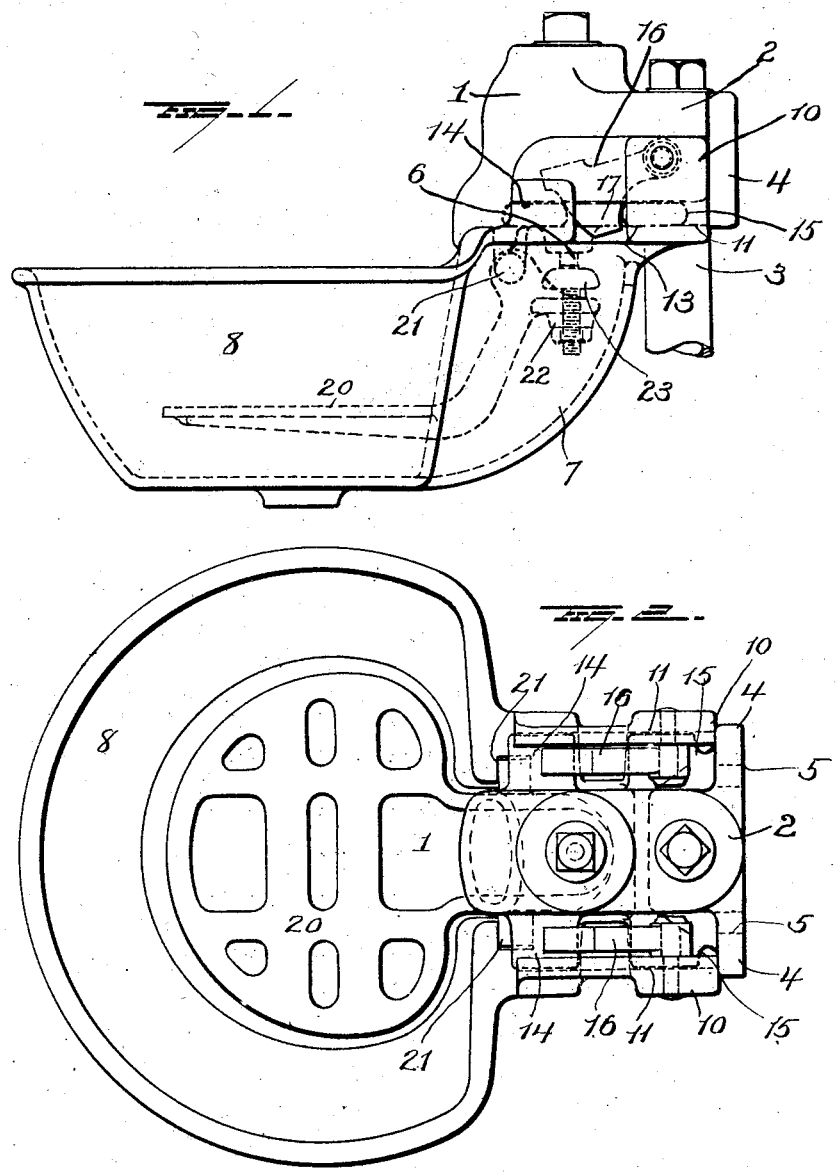

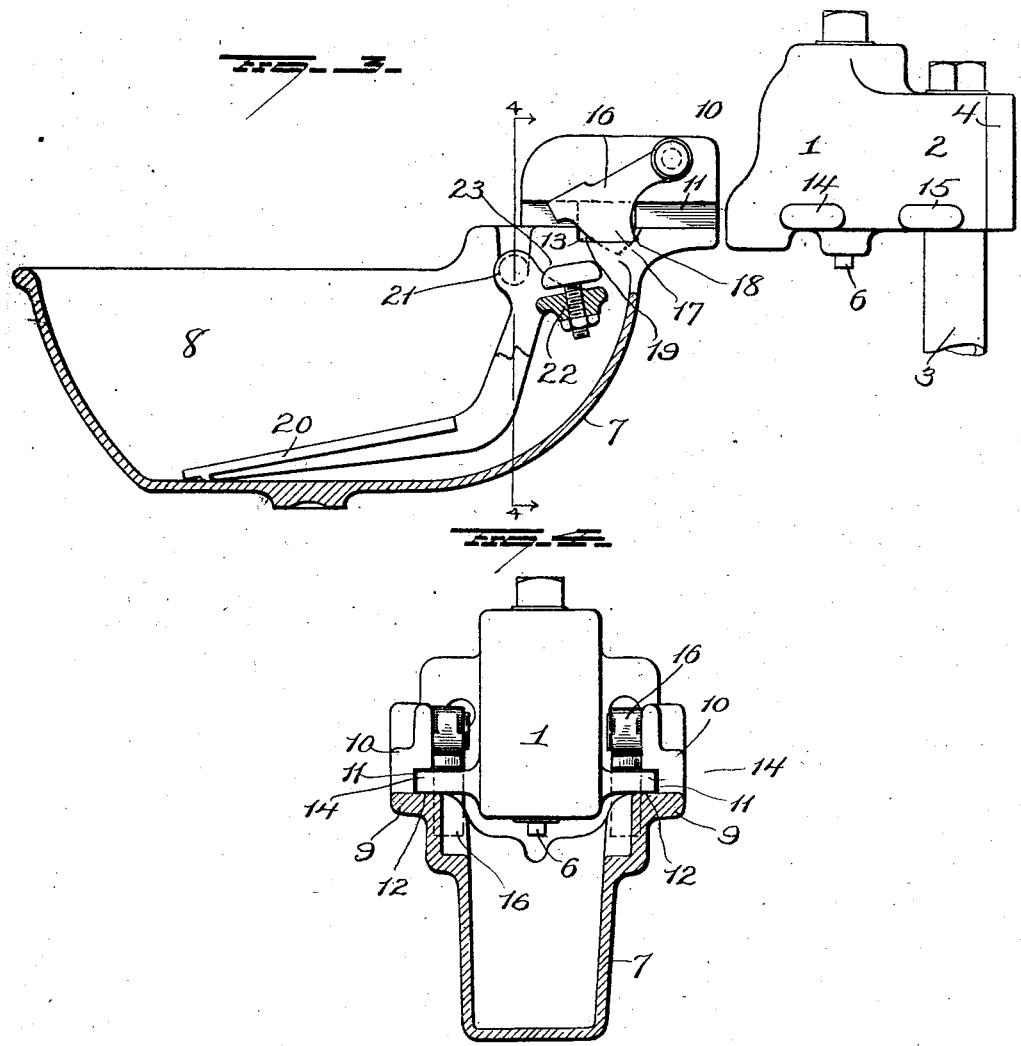

1,652,046

UNITED STATES PATENT OFFICE.

HUGO C. RASSMANN, OF BEAVER DAM, WISCONSIN, ASSIGNOR TO F. RASSMANN MANUFACTURING COMPANY, OF BEAVER DAM, WISCONSIN.

WATER-BOWL STRUCTURE.

Application filed March 7, 1925. Serial No. 13,792.

This invention relates to improvements in watering bowl constructions for cattle,—one object of the invention being to provide simple and efficient means to effect removable connection of the bowl with the fount.

A further object is to so construct connecting means between a bowl and a fount that the bowl shall be removably supported but normally held rigidly, and so that compensation for wear shall be effected.

A further object is to so mount a bowl on and connect the same with a fount, that it may be removed from the fount in a direction at right angles to the latter and its support, thus obviating necessity for lifting or swinging the bowl either in removing the same from the fount or applying it thereto.

With these and other objects in view, the invention consists in certain novel features of construction and combinations of parts as hereinafter set forth and pointed out in the claims.

In the accompanying drawings:

Figure 1 is a view in side elevation showing a watering bowl structure embodying my improvements;

Figure 2 is a plan view;

Figure 3 is a sectional view, partly in elevation, showing the bowl separated from the fount, and Figure 4 is a view in section, on the line 4—4 of Figure 3.

In the drawings, a fount is represented at 1 and is preferably made of small size so that its water chamber cannot retain sufficient water to cause damage to the casting in case of freezing.

The fount is made with a rearward hollow extension 2, with which a water supply pipe 3 may be suitably connected and said rearward extension forms a bracket having flanges 4 provided with perforations 5 for the accommodation of fastening devices by means of which the fount may be secured to a suitable support.

The fount contains a suitable valve (not shown) having a stem 6 to depend into the chamber of a rearward extension 7 on a bowl 8.

In the embodiment of the invention shown in the drawings, the side walls of the bowl extension 7 are provided with lateral horizontal flanges 9, and at the free edge portions of these flanges, upright flanges 10 are located,—said upright flanges being recessed to provide ways or grooves 11, the seat portions 12 of which are formed by the upper flanged edges of the side walls of the bowl extension 7. The flanges 10 and seat portions 12 may be formed intermediate their ends with openings 13, for a purpose hereinafter explained.

The ways 11 on the bowl extension receive lugs projecting laterally from the lower portion of the fount 1 and its rearward extension 2. In the embodiment of the invention shown in the drawings, two lateral lugs 14—15 are shown at each side of the fount, and between the lugs of the respective pairs, latches 16 are adapted to enter,—said latches being so cooperable with the lugs 14 as to prevent displacement of the bowl when the latter shall have been applied to the fount as shown in Figure 1. The latches 16 are shown as being pivotally attached to the flanges 10 on the bowl extension 7, and each latch is formed with an approximately hookshaped head 17 which may enter the openings 13 and rest (when the bowl is separated from the fount) upon shoulders 18 formed by the rear walls of said openings, as shown in Figure 3. The forward edge 19 of each latch is curved or beveled eccentrically to the pivotal mounting of the latch, so that said latch heads have a general wedge shape. Initially, or when the structure is new, the eccentric or beveled edges of the latch heads will engage at points intermediate of their ends with the forward lugs 14, and said latch heads will become wedged behind the lateral lugs 14, thus holding the bowl firmly attached to the fount. On account of the rubbing of the cattle against the bowl, the latches are liable to become worn, but compensation for such wear will be afforded by the gradual descent of the latches (on account of the eccentric or beveled forward edges of their heads), and the firm attachment of the bowl to the fount will be insured at all times, regardless of wear.

It will be observed that the bowl is supported solely by the fount directly and that such support is independent of the latches, the latter serving merely to hold the bowl firmly to the fount and prevent its detachment therefrom by the cattle.

To remove the bowl from the fount for cleaning purposes, it is simply necessary to raise the latches (and the openings will facilitate access to the latches for this purpose)

and then withdraw the bowl in a horizontal direction at right angles to the vertical axes of the fount and its support. This renders it possible to mount the bowl and fount near the floor where small animals, such as hogs, may readily drink therefrom.

An animal operated lever 20 is located in the bowl and has pivotal mountings at 21 in the walls of the bowl extension 7. This lever is provided with an arm 22, and through this arm, a threaded adjusting device 23 passes. The headed upper end of said device bears against the stem 6 of the valve of the valved fount, so that the animal operated lever 20 is supported in normal position by said stem, it being understood that the valve from which said stem projects is spring-seated.

In the embodiment of my invention shown in the drawings, the bowl is provided with ways to receive supporting lugs on the fount, but it will be understood that the ways may be on the fount and the lugs on the bowl, and again, the latches are shown as being pivotally supported by the bowl, but if desired, they may be carried by the fount. Two latches are shown in the drawing, but one of the latches may be omitted if desired.

Various changes might be made in the details of construction of my invention without departing from the spirit of the latter or limiting its scope and hence I do not restrict myself to the precise details herein set forth.

Having fully described my invention what I claim as new and desire to secure by Letters-Patent, is:—

1. In a watering bowl structure the combination with a fount, of a bowl having a rear extension formed to span the bottom of the fount, interengaging ways and projections between and housed by the sides of the fount and the sides of the bowl extension, and a latch also housed between sides of the fount and the bowl extension and engaging between the projections to resist withdrawal of the bowl from the fount.

2. In a watering bowl structure, the combination with a fount, and a bowl, of cooperating spaced lugs and ways on the fount and the bowl for supporting the bowl removably in a horizontal position, and a latch between the bowl and the fount for retaining the bowl against removal from horizontal position, said latch having a wedge head engaging between the spaced lugs and bearing against the forward lug.

3. In a watering bowl structure, the combination with a fount, and a bowl, of means between the fount and the bowl for supporting the bowl removably in a horizontal position, and a latch between the bowl and the fount for retaining the bowl against removal from horizontal position, said latch being pivotally mounted and the engaging portion of said latch with the lateral projection being eccentric to the pivotal mounting thereof.

4. The combination with a fount, and a bowl, of means normally and removably supporting the bowl in a horizontal position, said means including a projection on one of said parts to engage a way on the other part, and a pivoted latch having automatically wear-compensating relation to said projection.

5. The combination with a fount, and a bowl, of means removably supporting said bowl in a horizontal position on the fount, said means including a lug on one of said parts to engage the other part, and a pivoted latch having wedge relation to said lug whereby the bowl will be held firmly and automatically compensate for wear.

In testimony whereof, I have signed this specification.

HUGO C. RASSMANN.